United States Patent
De La Presilla et al.

(10) Patent No.: US 7,635,133 B2
(45) Date of Patent: Dec. 22, 2009

(54) SCUBA TANK CART

(76) Inventors: Cesar De La Presilla, 3915 SW. 58th Ter., Hollywood, FL (US) 33023; Michael C. Schmidt, 117 Pearl Ave., Tavernier, FL (US) 33070

( * ) Notice: Subject to any disclaimer, the term of this patent is extended or adjusted under 35 U.S.C. 154(b) by 108 days.

(21) Appl. No.: 11/907,390

(22) Filed: Oct. 11, 2007

(65) Prior Publication Data

US 2008/0106051 A1 May 8, 2008

Related U.S. Application Data

(60) Provisional application No. 60/856,305, filed on Nov. 3, 2006.

(51) Int. Cl.
*B62B 1/22* (2006.01)
(52) U.S. Cl. ..................... 280/47.26; D34/24
(58) Field of Classification Search ............. 280/47.17, 280/47.24, 47.26, 47.31; 441/133; D34/24
See application file for complete search history.

(56) References Cited

U.S. PATENT DOCUMENTS

| | | | |
|---|---|---|---|
| 4,345,789 A * | 8/1982 | Garnett | 294/31.2 |
| 4,645,465 A | 2/1987 | Courtney | |
| 4,815,761 A | 3/1989 | Henderson et al. | |
| 5,082,464 A * | 1/1992 | Clink | 440/6 |
| 5,163,694 A * | 11/1992 | Reichek | 280/47.26 |
| 5,393,080 A | 2/1995 | Ross | |
| 5,433,230 A | 7/1995 | Miller | |
| D374,533 S | 10/1996 | Read | |
| 5,704,624 A | 1/1998 | Davis | |
| 5,788,475 A | 8/1998 | Henderson | |
| 6,030,146 A | 2/2000 | Nicolen et al. | |
| 6,047,983 A * | 4/2000 | Day, III | 280/652 |
| 6,129,490 A * | 10/2000 | Erskine et al. | 410/110 |
| D440,371 S * | 4/2001 | Stanek et al. | D34/24 |
| 6,325,395 B1 * | 12/2001 | Frymoyer | 280/47.26 |
| 6,508,477 B2 * | 1/2003 | Burkett | 280/47.26 |
| 6,533,298 B2 * | 3/2003 | Sims | 280/47.26 |
| 6,565,103 B2 | 5/2003 | Wilson | |
| 6,926,293 B1 * | 8/2005 | Pope | 280/79.11 |

(Continued)

FOREIGN PATENT DOCUMENTS

GB    2 394 035    4/2004

OTHER PUBLICATIONS

"Hookah Hooker Floating Ironman Air Compressor" http://www.shop.com/op~Hookah_Hooker_Floating_Ironman_Air_Compressor-prod-19614087-26912056?sourceid=298 retrieved on Sep. 13, 2006.

(Continued)

*Primary Examiner*—Frank B Vanaman
(74) *Attorney, Agent, or Firm*—Richard C. Litman

(57) ABSTRACT

The scuba tank cart is a scuba transporting apparatus that provides a device for storing a scuba tank, transporting the tank, and using the apparatus as a tank flotation device for diving and snorkeling. The cart has a roller, a cavity to fit a scuba tank, and a bracket to store a hose and regulator. The cart is designed so that when the cart is in the water, the cart floats horizontally to support the tank above the water while the user is underwater carrying only the hose for breathing.

8 Claims, 6 Drawing Sheets

U.S. PATENT DOCUMENTS

| | | |
|---|---|---|
| 6,973,928 B1 | 12/2005 | Taylor, II et al. |
| 2001/0035620 A1 | 11/2001 | Wilson |
| 2004/0104550 A1 | 6/2004 | Do |
| 2004/0255938 A1 | 12/2004 | Shragge |
| 2006/0071435 A1 | 4/2006 | Zwack |

OTHER PUBLICATIONS

"Scuba Cart Gravel Solo" http://cgi.ebay.com/ws/eBayISAPI. dll?ViewItem&item=3612379323&category=1300 retrieved on Sep. 13, 2006.

* cited by examiner

SCUBA TANK CART

CROSS-REFERENCE TO RELATED APPLICATION

This application claims the benefit of U.S. Provisional Patent Application Ser. No. 60/856,305, filed Nov. 3, 2006.

BACKGROUND OF THE INVENTION

1. Field of the Invention

The present invention relates to diving equipment for underwater swimming, and more specifically to a scuba tank cart having the capability to float a scuba tank while a user dives underwater carrying only the breathing hose.

2. Description of the Related Art

In some forms of underwater diving or swimming, a compressor carried on a boat or floated upon the water provides air to underwater breathing rigs. Generally powered by electric, diesel or gas, these devices can provide a diver or group of divers the required compressed air to successfully complete a dive without carrying a tank. Problems with the use of these devices include the bulk and weight and expense of the engine providing the compressed air.

Additional problems include the bulk of the flotation device used in keeping the air compressor "high and dry" while floating in the water. Additionally, an adequate fuel supply must be furnished for compressor operations during dive time. Moreover, the floatation device must be inflated from some source, usually off the compressor. The additional step of inflating the flotation device must be accounted for, thus reducing total dive time available. A basic surface floating compressor underwater breathing rig may require two or more divers to set up the compressor/engine assembly and float.

Thus, a scuba tank cart solving the aforementioned problems is desired.

SUMMARY OF THE INVENTION

The scuba tank cart is a scuba transporting apparatus that provides a device for storing a scuba tank, transporting the tank, and using the apparatus as a tank flotation device for diving and snorkeling. The cart has a roller, a body defining a cavity to fit a scuba tank, and a bracket to store a hose and regulator. The cart is designed so that when the cart is in the water, the cart floats horizontally to support the tank above the water while the user is underwater carrying only the hose.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
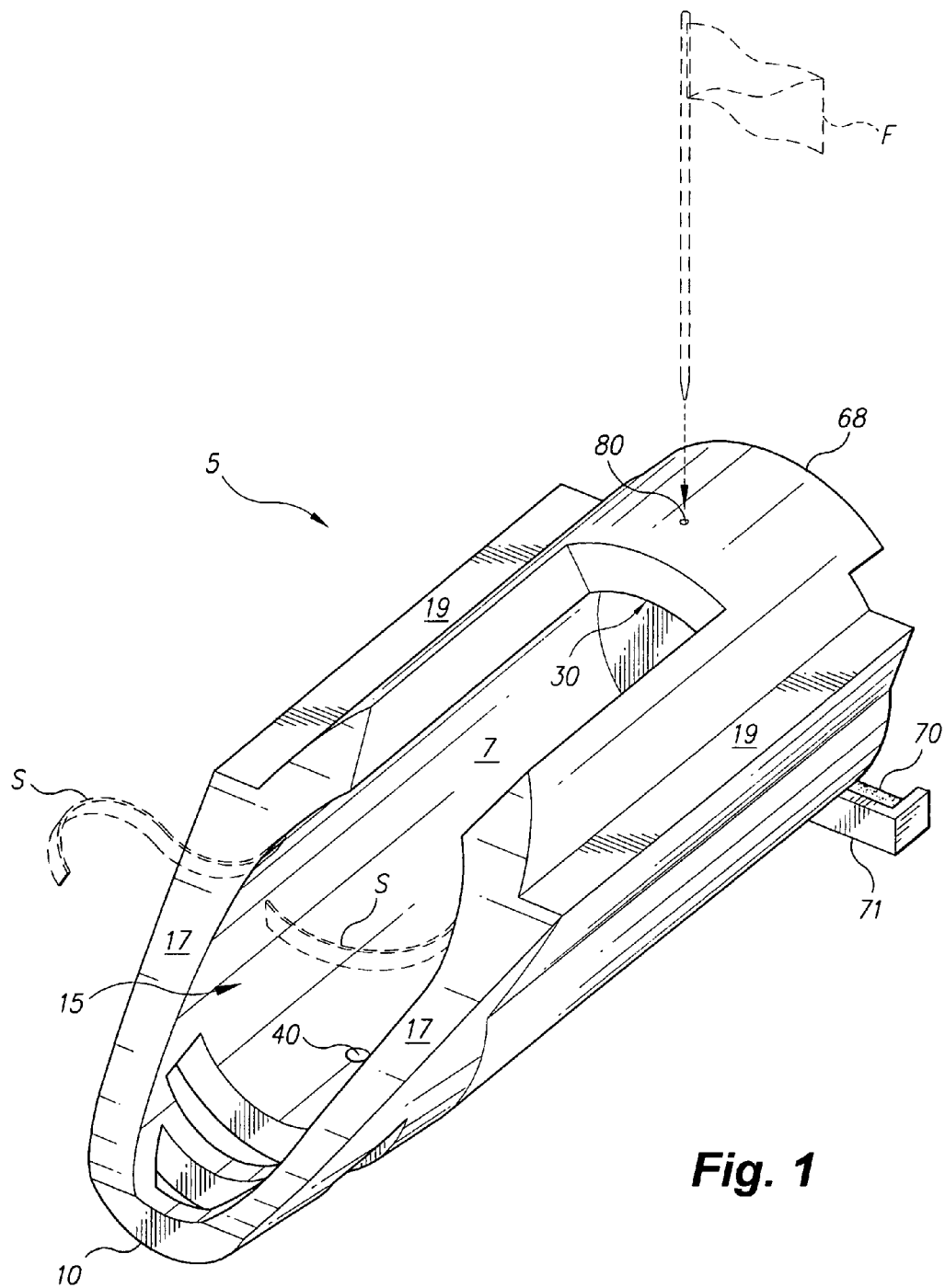
FIG. 1 is a perspective view of a scuba tank cart according to the present invention as seen from the top front of the cart.
Figure 2:
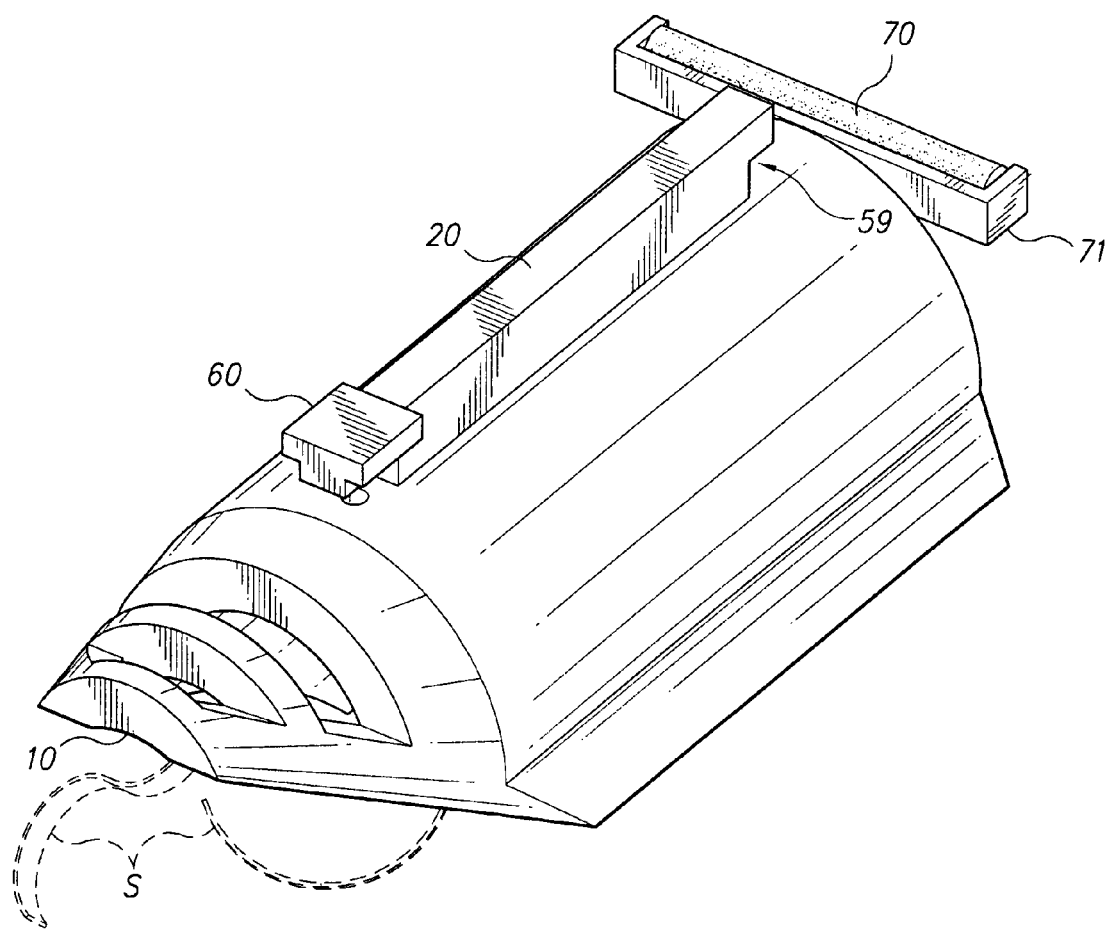
FIG. 2 is a perspective view of the scuba tank cart according to the present invention as seen from the top rear of the cart.
Figure 3:
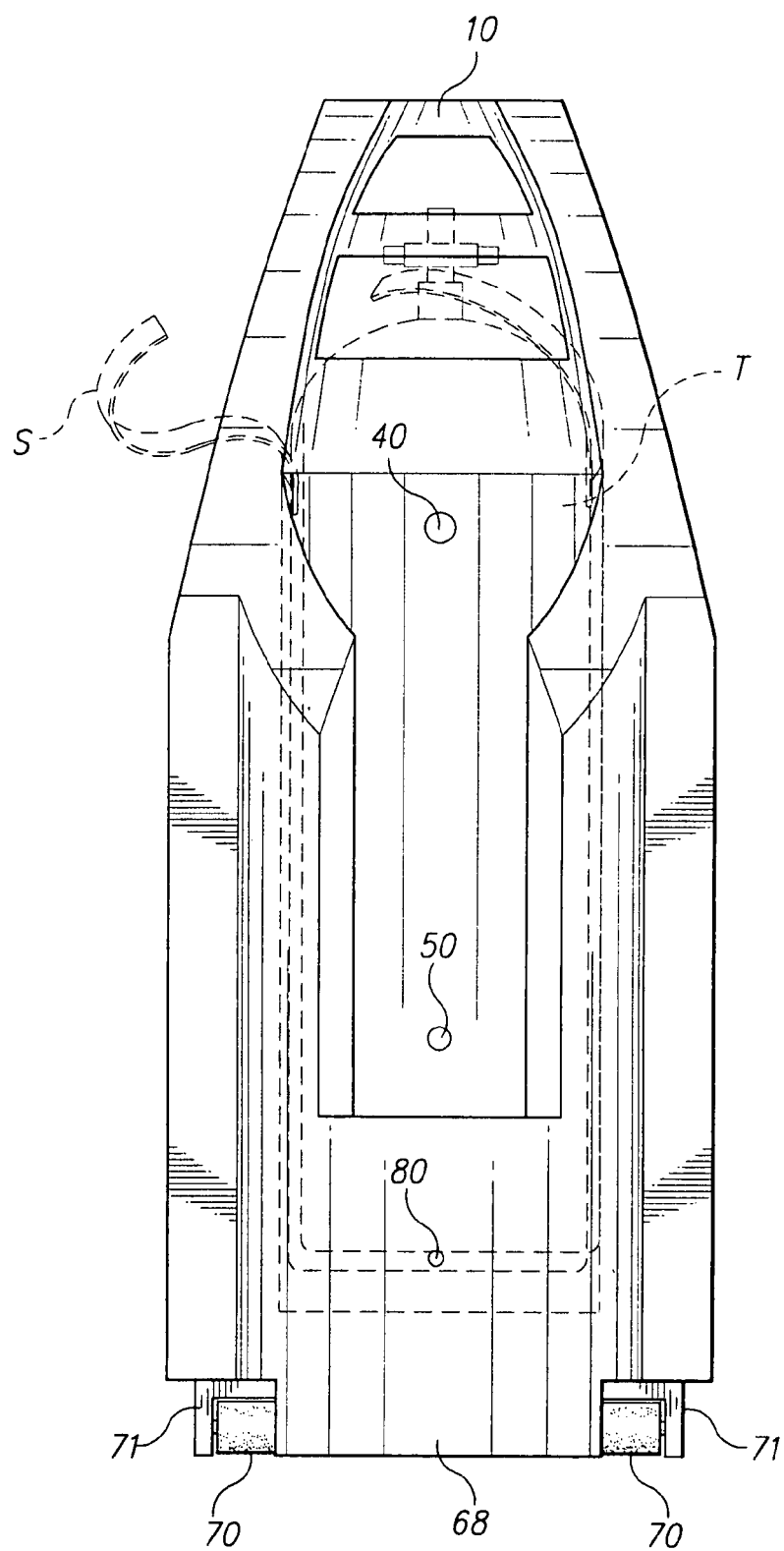
FIG. 3 is a front view of the scuba tank cart according to the present invention.
Figure 4:
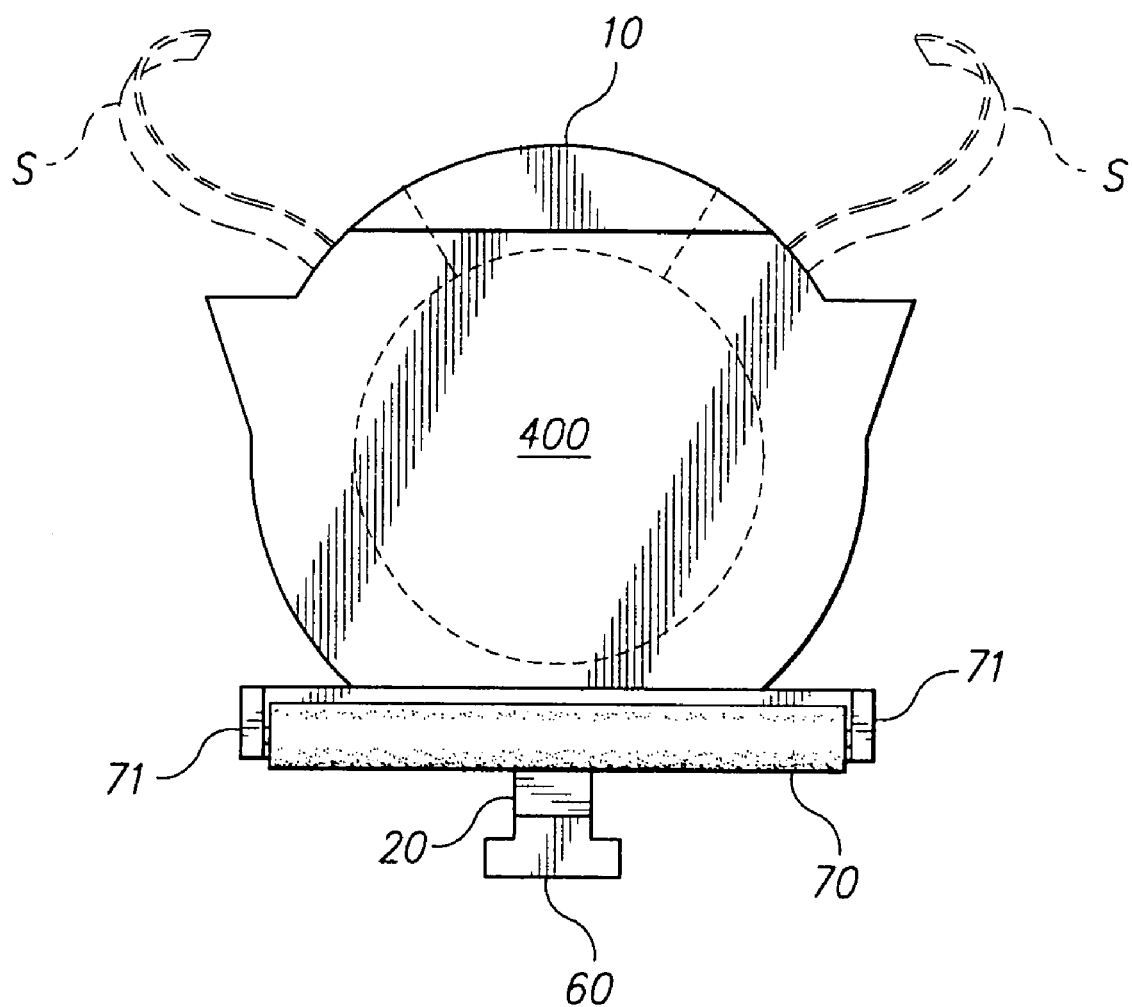
FIG. 4 is a bottom view of the scuba tank cart according to the present invention.
Figure 5:
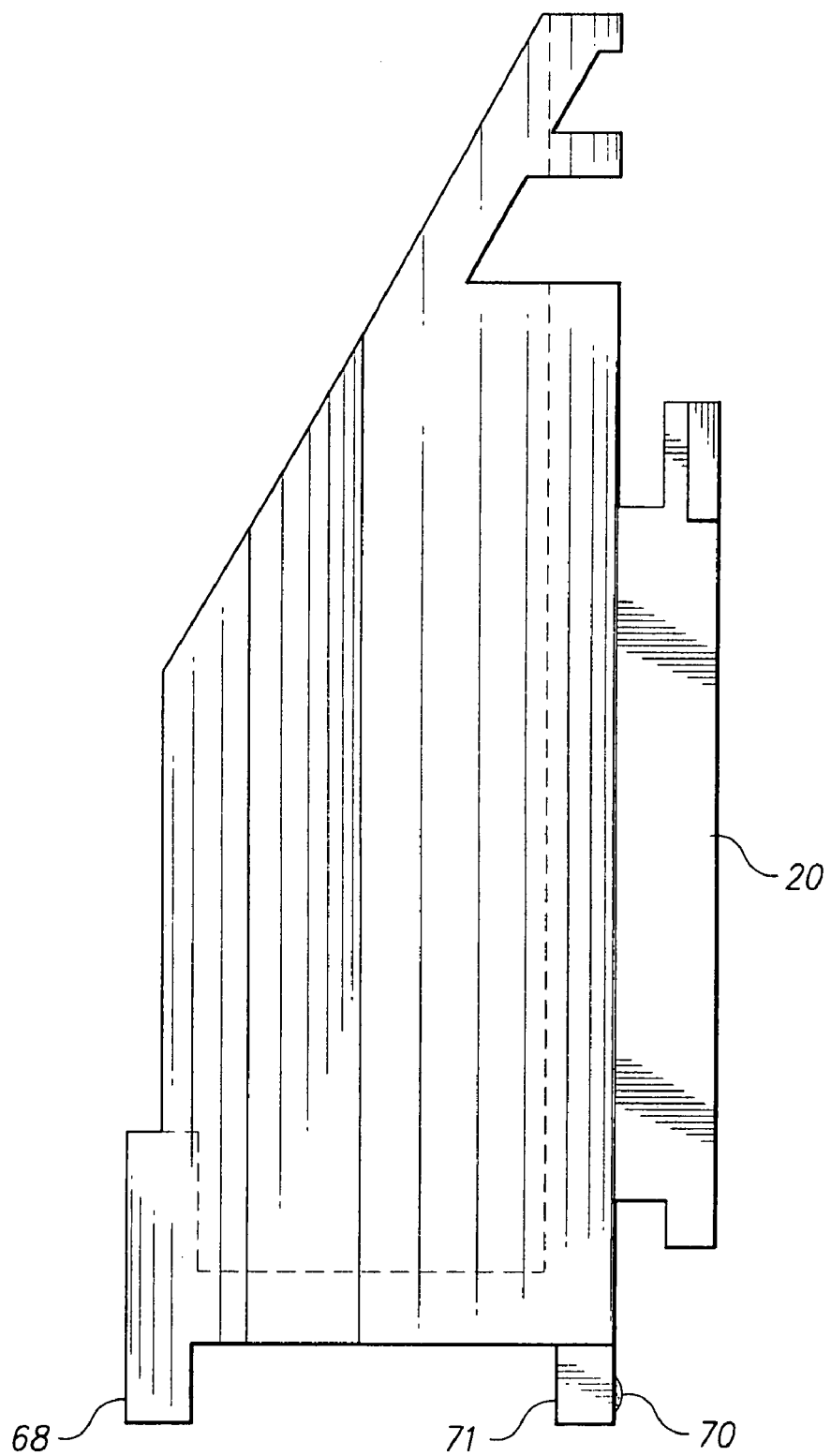
FIG. 5 is a side view of the scuba tank cart according to the present invention.
Figure 6:
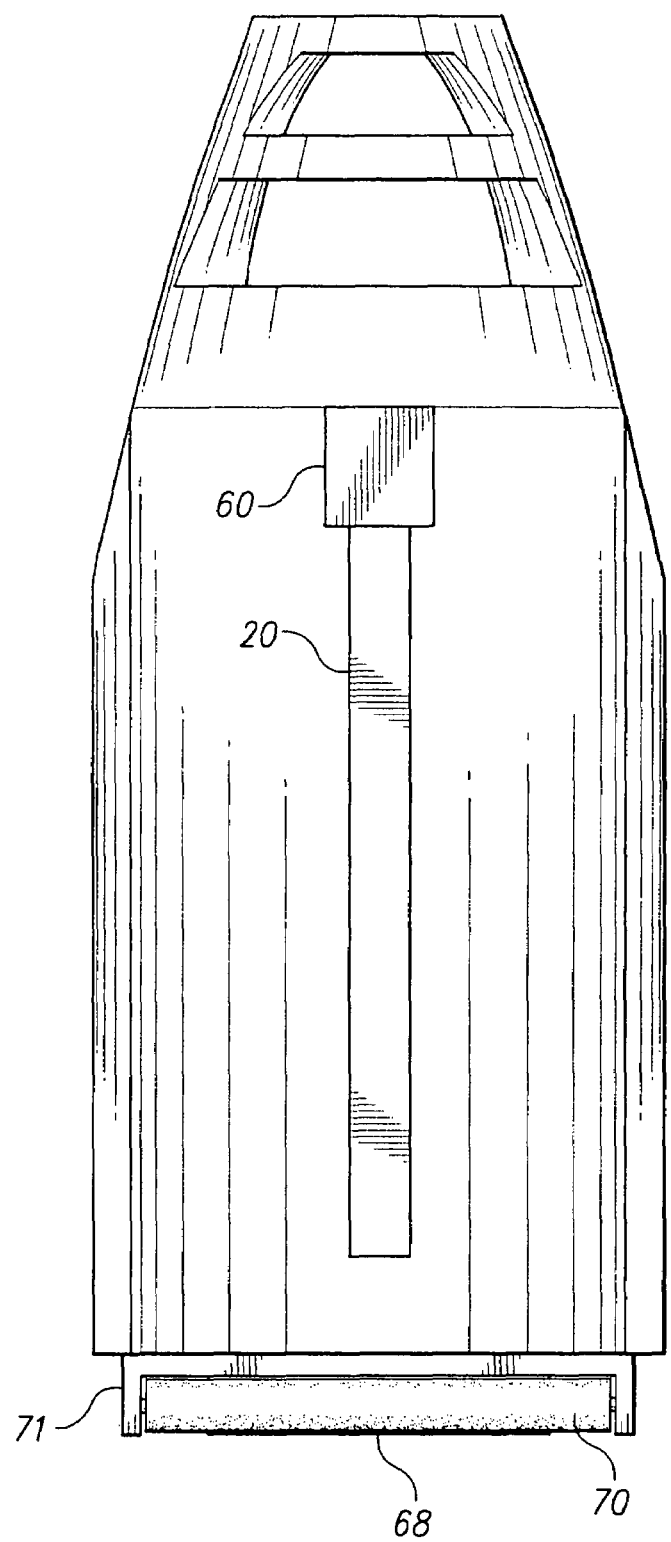
FIG. 6 is a rear view of the scuba tank cart according to the present invention.

As shown in FIGS. 1 and 3, the present invention is a scuba tank cart 5 that provides a means of storing a scuba tank T, transporting the tank, and using the apparatus as a tank flotation device in a body of water for diving and snorkeling (scuba is a word now in common parlance that developed from the acronym for Self Contained Underwater Breathing Apparatus). The cart 5 may be made of any seaworthy material, such as a lightweight polymer, metal, fiberglass, or the like. The cart 5 has a roller 70, a body that defines a cavity 15 to fit the scuba tank T, and a rack 20 to store a hose and regulator. As shown in FIGS. 2, 4, 5, and 6, the rack 20 is comprised of an elongate member that extends upward from a location proximate the bottom 400 of the cart 5. The bottom portion of the rack 20 has a recess defined between the elongate member and the body of the cart 5 for winding the hose around the rack 20. The top portion of the rack 20 has a T shaped member 60 for securing the hose and regulator thereon.

The substantially open cylindrical design of cart 5 provides a substantially cylindrical sidewall 7 having an opening that forms a cavity 15 so that, when in place, a substantial surface area of the tank T is cradled by the cart 5. As shown in FIG. 1, a hydrodynamic, open, top face 17 of the device is produced by a crosscut slice of the device 5 that is oblique to the generally cylindrical shape of the device 5. Retaining belt or strap S may be provided near the top face 17 in order to further secure the tank T to the cart 5. To further enhance the hydrodynamic shape of the device 5, a region of the top face 17 adjacent the front of the cart 5 can be designed to extend into longitudinal wedge-like sides 19 that flare out away from the cylindrical body of the device 5, much like the sides of a boat.

A floor of the top face area may have two openings. The most forward opening provides a handle 10 that can be used to grab for pulling the cart 5 from place to place. The hydrodynamic shape of the cart 5 provides the cart 5 with the capability to float horizontally in water to support the tank T above the water while a user can be underwater carrying only the hose for breathing.

A flag-mounting bore 80 is provided at the bottom frontside of the cart 5. The flag mounting bore 80 allows a diving flag F to be mounted on the device, as is generally required during a dive by custom and by law. As shown in FIG. 1, the lower portion of the cart 5 is completely cylindrical to provide a tank enclosure pocket 30 that enhances the stability of the tank when the cart 5 is upright.

As most clearly shown in FIG. 3, a tank locking bore 40 is provided on the rear of sidewall 7 of cart 5 so that tank T can be securely locked into the cart 5. A drain hole 50 is provided in the rear of sidewall 7 to allow water to drain out of the cart 5. As shown in FIGS. 2 through 6, the roller 70 is supported by a roller bracket 71, the roller bracket 71 being disposed across the bottom of the cart 5.

As shown in FIGS. 1, 4, 5 and 6, a cart stand 68 that extends from the bottom 400 at the front of the device 5 opposite roller 70 is provided to stabilize the cart 5 when the cart 5 is placed in an upright resting position on land. The stand 68 extends approximately the same distance away from the bottom 400 as does the roller bracket 71, so that the roller bracket 71 and the cart stand 68 support the cart 5 in the upright resting position on land, or other solid surface.

It is to be understood that the present invention is not limited to the embodiment described above, but encompasses any and all embodiments within the scope of the following claims.

We claim:

1. A scuba tank cart capable of floating, comprising:

a substantially cylindrical exterior and interior sidewall defining an arcuate surface of at least 180° and being made of buoyant material, said sidewall defining a front-side of the cart and a rear-side of the cart, a top end and a bottom end, the bottom end being closed by a portion of the exterior front-side cylindrical wall at a distance above the interior bottom surface of the cart, the interior sidewall defining a cylindrical cavity and having an elongate, oblique opening at the top end defined by continuous sides of the sidewall for placement of a scuba tank within the cavity, wherein a region of the top end adjacent the front-side of the cart extends into longitudinal sides flaring out away from the cylindrical body of the cart to provide the cart with greater hydrodynamic stability;

a rack disposed on the exterior cylindrical face of the sidewall between the top and bottom ends and configured for mounting and storage of a scuba hose and regulator thereon;

a roller assembly mounted on the bottom end of the sidewall; and a support stand mounted on the bottom end of the sidewall opposite the roller assembly;

wherein when a scuba tank is mounted in the cart, the tank can be transported over a solid surface, and can be floated horizontally in water while a user can dive carrying only the hose for breathing.

2. The scuba tank cart according to claim 1, wherein a bottom portion of the rack has a recess defined between the rack member and the body of the cart for winding the scuba hose thereon.

3. The scuba tank cart according to claim 1, further comprising a T-shaped member disposed on a top portion of the rack for securing the hose and regulator thereon.

4. The scuba tank cart according to claim 1, further comprising a flexible retaining member disposed on the cart near the top end in order to ensure securement of a tank to the cart.

5. The scuba tank cart according to claim 1, wherein the top end has a floor having two openings defined therein, one of the two openings being forward and adapted for providing a handle to facilitate a user pulling the cart from place to place.

6. The scuba tank cart according to claim 1, wherein the sidewall has a flag mounting bore defined therein adapted for supporting a diving flag.

7. The scuba tank cart according to claim 1, wherein the sidewall has a tank locking bore defined therein adapted for locking the tank to the cart.

8. The scuba tank cart according to claim 1, wherein said sidewall has a drain hole defined therein for allowing water to drain out of the cart.

* * * * *